US006094207A

United States Patent [19]

Wen et al.

[11] Patent Number: 6,094,207

[45] Date of Patent: Jul. 25, 2000

[54] MICROFLUIDIC IMAGE DISPLAY USING MELTED INK

[75] Inventors: Xin Wen; Werner Fassler, both of Rochester; Charles D. DeBoer, Palmyra, all of N.Y.

[73] Assignee: Eastman Kodak Company, Rochester, N.Y.

[21] Appl. No.: 08/970,037

[22] Filed: Nov. 13, 1997

[51] Int. Cl.[7] .................................................... G01D 15/16

[52] U.S. Cl. ........................................................ 346/140.1

[58] Field of Search .............................. 346/140.1; 347/7, 347/37, 88, 103

[56] References Cited

U.S. PATENT DOCUMENTS

| | | | |
|---|---|---|---|
| 5,575,208 | 11/1996 | Kirihara | 101/366 |
| 5,585,069 | 12/1996 | Zanzucchi et al. | 106/31.6 |
| 5,593,838 | 1/1997 | Zanzucchi et al. | 106/31.43 |
| 5,603,351 | 2/1997 | Cherukuri et al. | 137/597 |
| 5,611,847 | 3/1997 | Guistina et al. | 435/6 |
| 5,621,444 | 4/1997 | Beeson | 347/88 |
| 5,679,139 | 10/1997 | McInerney et al. | 422/100 |
| 5,745,128 | 4/1998 | Lam et al. | 346/140.1 |
| 5,771,810 | 6/1998 | Wolcott | 347/43 |
| 5,821,963 | 10/1998 | Sutera et al. | 347/68 |

OTHER PUBLICATIONS

"Electroosmosis: A Reliable Fluid Propulsion System for Flow Injection Analysis" by Purnendu Dasgupta and Shaorong Liu, Anal., Chem. 66, pp. 1792–1798 (1994).

*Primary Examiner*—N. Le
*Assistant Examiner*—Lamson D. Nguyen
*Attorney, Agent, or Firm*—Raymond L. Owens

[57] ABSTRACT

A display apparatus responsive to an image file for displaying a plurality of pixels including a plurality of ink display chambers; ink channels for delivering melted inks to each ink display chamber; and first heater elements for melting solid ink which is to be delivered through the ink channels to the display chambers. The apparatus further includes second heater elements for melting solid ink in the display channels after an image has been displayed; and a computer for controlling the first heater elements for causing solid ink melted by the first heater elements to be delivered to the display chambers where it solidifies to form a display of an image and for controlling the second heater elements for melting solid ink in the chambers to discard ink in the display chambers whereby the display apparatus is conditioned to form a new display image.

5 Claims, 5 Drawing Sheets

MICROFLUIDIC IMAGE DISPLAY USING MELTED INK

CROSS REFERENCE TO RELATED APPLICATIONS

Reference is made to commonly assigned U.S. patent application Ser. No. 08/868,426 filed Jun. 3, 1997 entitled "Continuous Tone Microfluidic Printing; U.S. patent application Ser. No. 08/868,104 filed Jun. 3, 1997 entitled "Image Producing Apparatus for Microfluidic Printing; U.S. patent application Ser. No. 08/868,100 filed Jun. 3, 1997 entitled "Improved Image Producing Apparatus for Uniform Microfluidic Printing"; U.S. patent application Ser. No. 08/868,416 filed Jun. 3, 1997 entitled "Microfluidic Printing on Receiver"; and U.S. patent application Ser. No. 08/868,102 filed Jun. 3, 1997 entitled "Microfluidic Printing With Ink Volume Control". The disclosure of these related applications is incorporated herein by reference.

FIELD OF THE INVENTION

The present invention relates to displaying digital images by a microfluidic pumping apparatus.

BACKGROUND OF THE INVENTION

Microfluidic pumping and dispensing of liquid chemical reagents is the subject of three U.S. Pat. Nos. 5,585,069, 5,593,838, and 5,603,351, all assigned to the David Sarnoff Research Center, Inc. The system uses an array of micron sized reservoirs, with connecting microchannels and reaction cells etched into a substrate. Electrokinetic pumps comprising electrically activated electrodes within the capillary microchannels proved the propulsive forces to move the liquid reagents within the system. The electrokinetic pump, which is also known as an electroosmotic pump, has been disclosed by Dasgupta et al., see "Electroosmosis: A Reliable Fluid Propulsion System for Flow Injection Analyses", Anal. Chem. 66, pp 1792–1798 (1994). The chemical reagent solutions are pumped from a reservoir, mixed in controlled amounts, and then pumped into a bottom array of reaction cells. The array may be decoupled from the assembly and removed for incubation or analysis.

The above described microfluidic pumping apparatus can be used as a display. The pumped fluids to be displayed become ink solutions comprising colorants such as dyes or pigments. The array of reaction cells may be considered ink display chambers to be used for picture elements, or pixels, in a display, comprising mixtures of pigments having the hue of the pixel in the original scene. Such a display has the advantage that it may be changed simply by pumping new fluids to the display chambers. However, such a display has stability problems. Liquids may evaporate, plugging the apparatus. Moreover, liquids are mobile and may mix together, thus spoiling the accurate display of the hues of the original scene.

It is desirable to have a microfluidic pumped display that had a stable image that could be easily changed.

SUMMARY OF THE INVENTION

It is the object of this invention to provide a stable image display using microfluidic pumping apparatus in which displayed images can readily be changed.

This object is achieved by a display apparatus responsive to an image file for displaying a plurality of pixels, comprising:

a) a plurality of ink display chambers;

b) ink channels for delivering melted inks to each ink display chamber;

c) first heater elements for melting solid ink which is to be delivered through the ink channels to the display chambers;

d) second heater elements for melting solid ink in the display channels after an image has been displayed; and e) means for controlling the first heater elements for causing solid ink melted by the first heater elements to be delivered to the display chambers where it solidifies to form a display of an image and for controlling the second heater elements for melting solid ink in the chambers to discard ink in the display chambers whereby the display apparatus is conditioned to form a new display image.

ADVANTAGES

An advantage of this invention is that the display is stable, and does not change with time. Nevertheless, the displayed image can readily be changed when desired.

DETAILED DESCRIPTION OF THE INVENTION

The present invention is described in relation to a microfluidic display apparatus which can display computer generated images, graphic images, line art, text images and the like, as well as continuous tone images.

Figure 1:
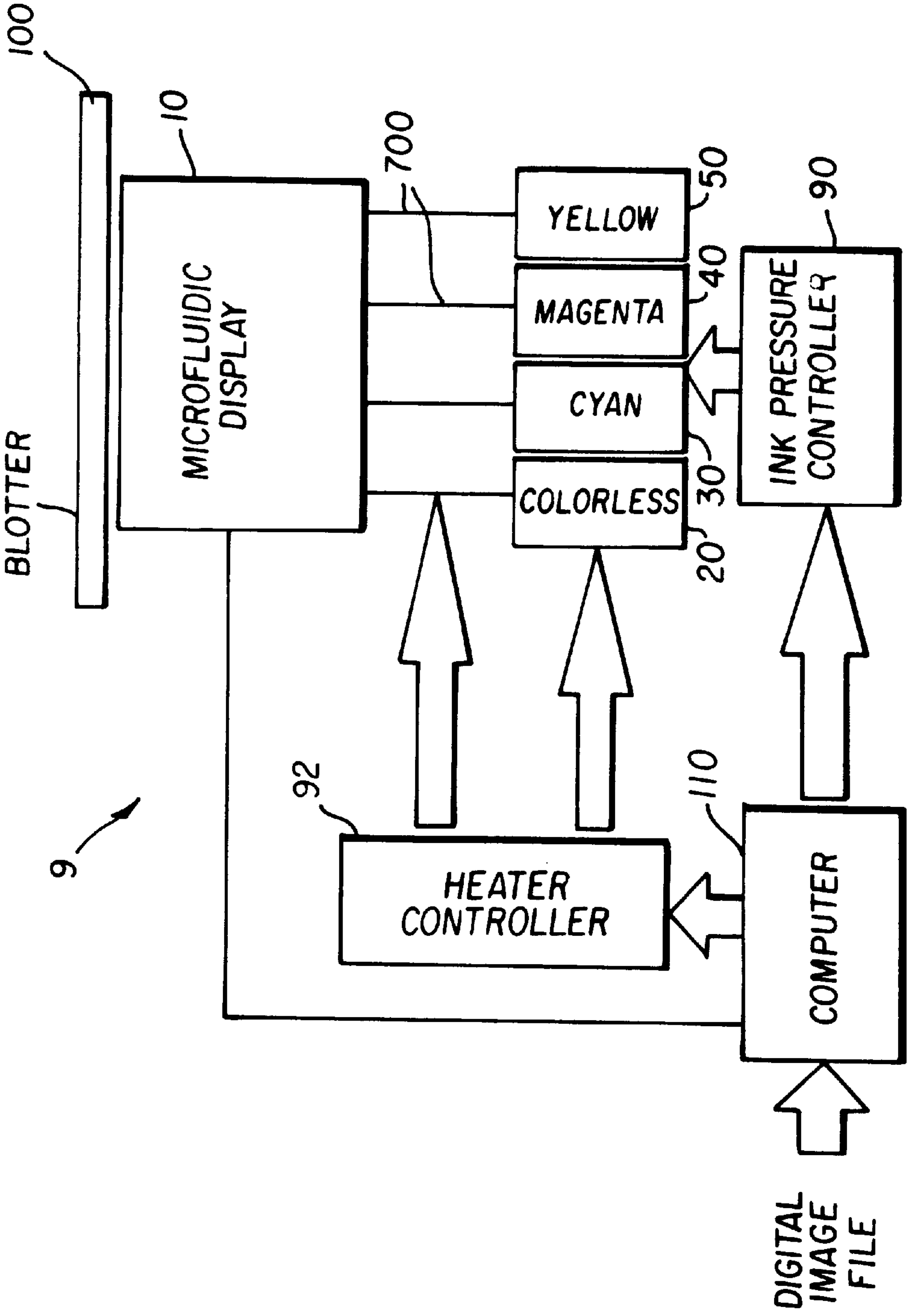
FIG. 1 is a schematic block diagram view showing a microfluidic display system for displaying a digital image.

Referring to FIG. 1, a schematic diagram is shown of a display apparatus 9 in accordance with the present invention. Reservoirs 20, 30, 40 and 50 are respectively provided for holding colorless ink, cyan ink, magenta ink, and yellow ink. All of these inks are in solid form. An ink pressure controller 90 pressurizes the ink reservoirs so that the ink will flow to the microfluidic display 10 when needed. The pressure controller 90 includes individual spring members which operate upon solid ink supplies to urge them to a position where they can be heated by corresponding first heater elements 700 which are disposed in the microchannels. A computer 10 is shown receiving signals representing a digital image and sending signals to the ink pressure controller 90 and to the heater controller 92 which then sends electrical impulses to the ink reservoirs and the capillary flow tubes to melt and cause the ink to flow. In addition, a blotter 100 is shown for receiving the spent ink of a displayed image that is being changed.

Figure 2:
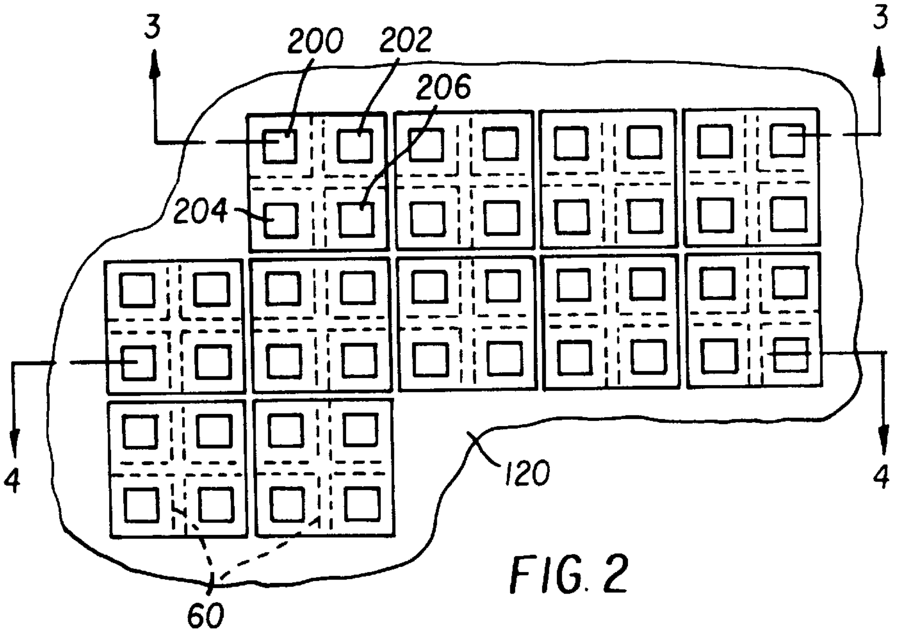
FIG. 2 is a top view of a pattern of the color pixels produced by the present invention.

FIG. 2 depicts a top view of an arrangement of display chambers 60 of the microfluidic display apparatus 9 shown in FIG. 1. Each ink display chamber 60 is capable of producing a mixed ink having any color saturation, hue and lightness within the color gamut provided by the set of cyan, magenta, yellow, and colorless inks used in the apparatus. The ink display chambers 60 are divided into four groups cyan ink display chamber 200; magenta ink display chamber 202; yellow ink display chamber 204; and colorless ink display chamber 206. Ink mixing is accomplished after each of the inks in solid form have been melted by the first heater elements. Each chamber is connected only to the respective colored ink reservoir and to the colorless ink reservoir 20. For example, the cyan display chamber 200 is connected to the cyan ink reservoir and the colorless ink reservoir so that cyan inks can be mixed to any desired lightness.

The inks used in this invention are dispersions of colorants in common solvents with melting points above room temperature. Examples of such inks may be found is U.S. Pat. Nos. 5,611,847 and 5,679,139. Inks may also be found in the following commonly assigned U.S. patent application Ser. No. 08/699,962 filed Aug. 20, 1996; U.S. patent application Ser. No. 08/699,963 filed Aug. 20, 1996; U.S. patent application Ser. No. 08/790,131 filed Jan. 29, 1997; and U.S. patent application Ser. No. 08/764,379 filed Dec. 13, 1996. In a preferred embodiment of the invention the solvent is a wax with a melting point between 30 and 60° C. Colorants such as the Ciba Geigy Unisperse Rubine 4BA-PA, Unisperse Yellow RT-PA, and Unisperse Blue GT-PA are also preferred embodiments of the invention. The colorless ink of this invention is the solvent for the colored inks in the most preferred embodiment of the invention. It will be understood by those skilled in the art that other colorants can be used such as dyes which are soluble in the preferred solvent.

The microchannel capillaries, display chambers, and microfluidic pumps are described in the references listed above.

Figure 3:
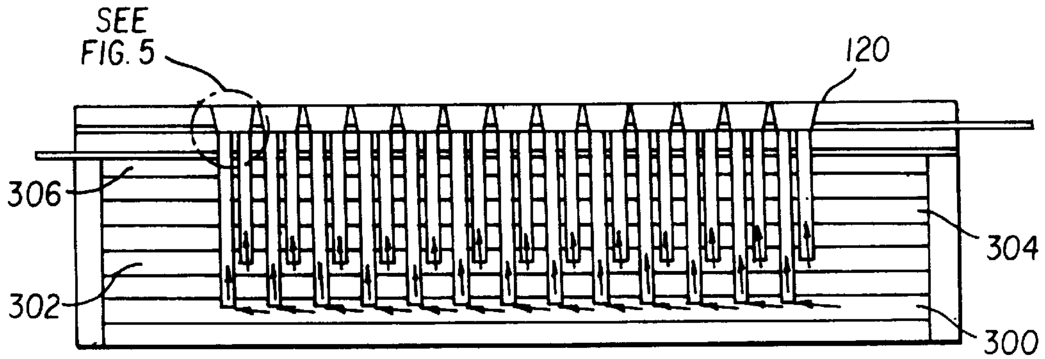
FIG. 3 is a cross-section view taken along the lines 3—3 of the microfluidic display apparatus in FIG. 2.

FIG. 3 illustrates a cross-sectional view through the line 3—3 of FIG. 2. The colored ink supplies 300, 302, 304 and 306 are shown fabricated in channels parallel to the display plate 120. The cyan, magenta, yellow and colorless inks are respectively delivered by colored ink supplies 300, 302, 304 and 306 to the display mixing chambers.

Figure 4:
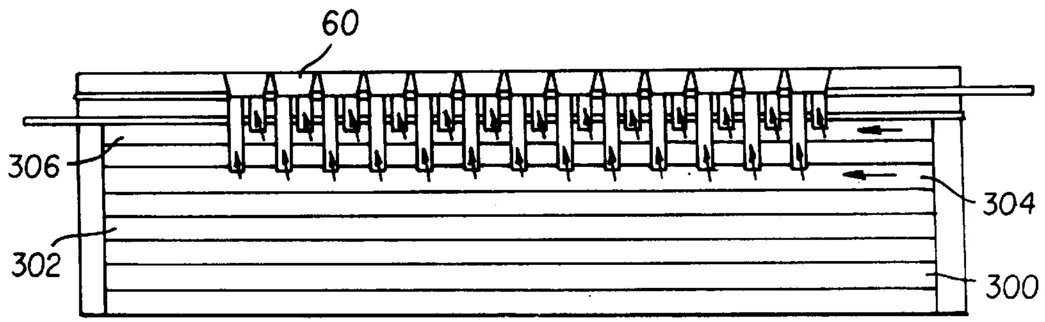
FIG. 4 is a another cross-section view along the lines 4—4 of the microfluidic display apparatus in FIG. 2.

FIG. 4 illustrates another cross-sectional view through the lines 4—4 of FIG. 2. The colored ink supplies 304 and 306 are shown in more detail.

Figure 5:
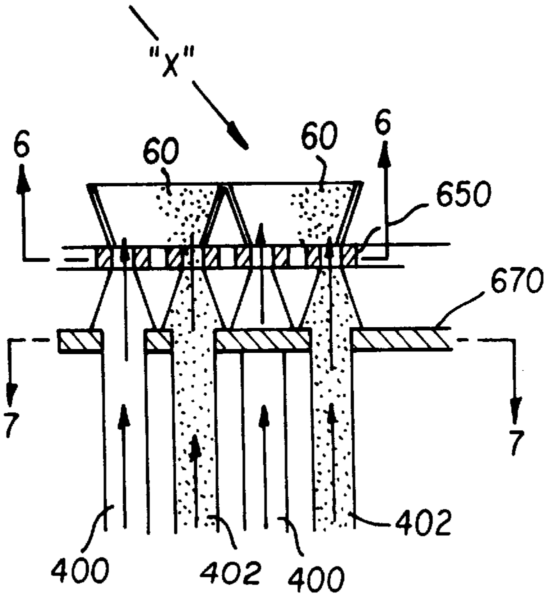
FIG. 5 is a detailed cross-section view of the microfluidic display apparatus in FIG. 3 showing the display chambers connected to microchannels.

Turning now to FIG. 5, the colored inks are delivered to the ink display chambers 60 respectively by cyan, magenta, yellow, and colorless ink microchannels 400, 402, 404, and 406. The colored ink microchannels 400, 402, 404, and 406 are respectively connected to the colored ink supplies 300, 302, 304, and 306 (FIGS. 4 and 5). The image produced by the ink display chambers 60 is viewed along the general direction indicated by the arrow "x".

Figure 7:
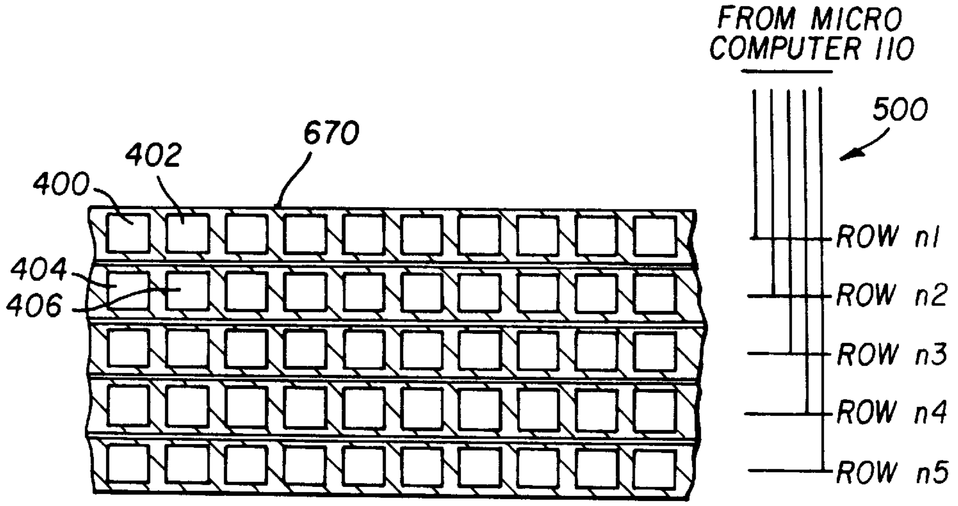
FIG. 7 is a top view along the lines 7—7 in FIG. 5.

A top view of the plane along the line 6—6 in FIG. 5 is shown in FIG. 7. The cyan, magenta, yellow, and colorless ink micronozzles 600, 602, 604, and 606 are distributed in the same arrangement as the colored ink micro channels 300–304. The column electrodes 650 are connected to the pinch electrode and the heater, which is illustrated in detail in FIG. 9. The column electrodes 650 are shown connected to the conducting circuit 550, which is further connected to the computer 110.

Figure 6:
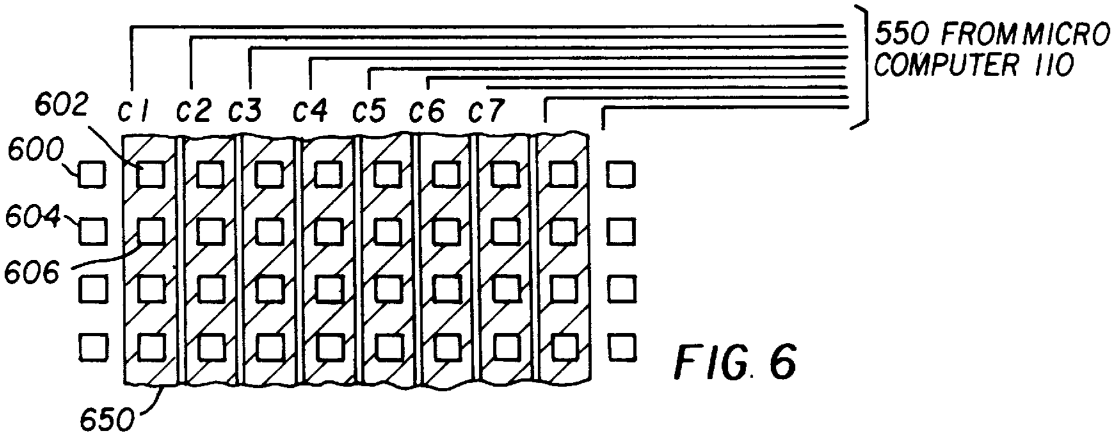
FIG. 6 is a top view along the lines 6—6 of the microfluidic display apparatus in FIG. 5.

FIG. 7 is a cross sectional view taken along the lines 7—7 in FIG. 6. The cyan, magenta, yellow, and colorless ink supplies 400, 402, 404, and 406 are shown. The row electrodes which complete the electrokinetic pump circuits are shown connected to the conducting circuit 500, which is further connected to the computer 110.

Figure 8:
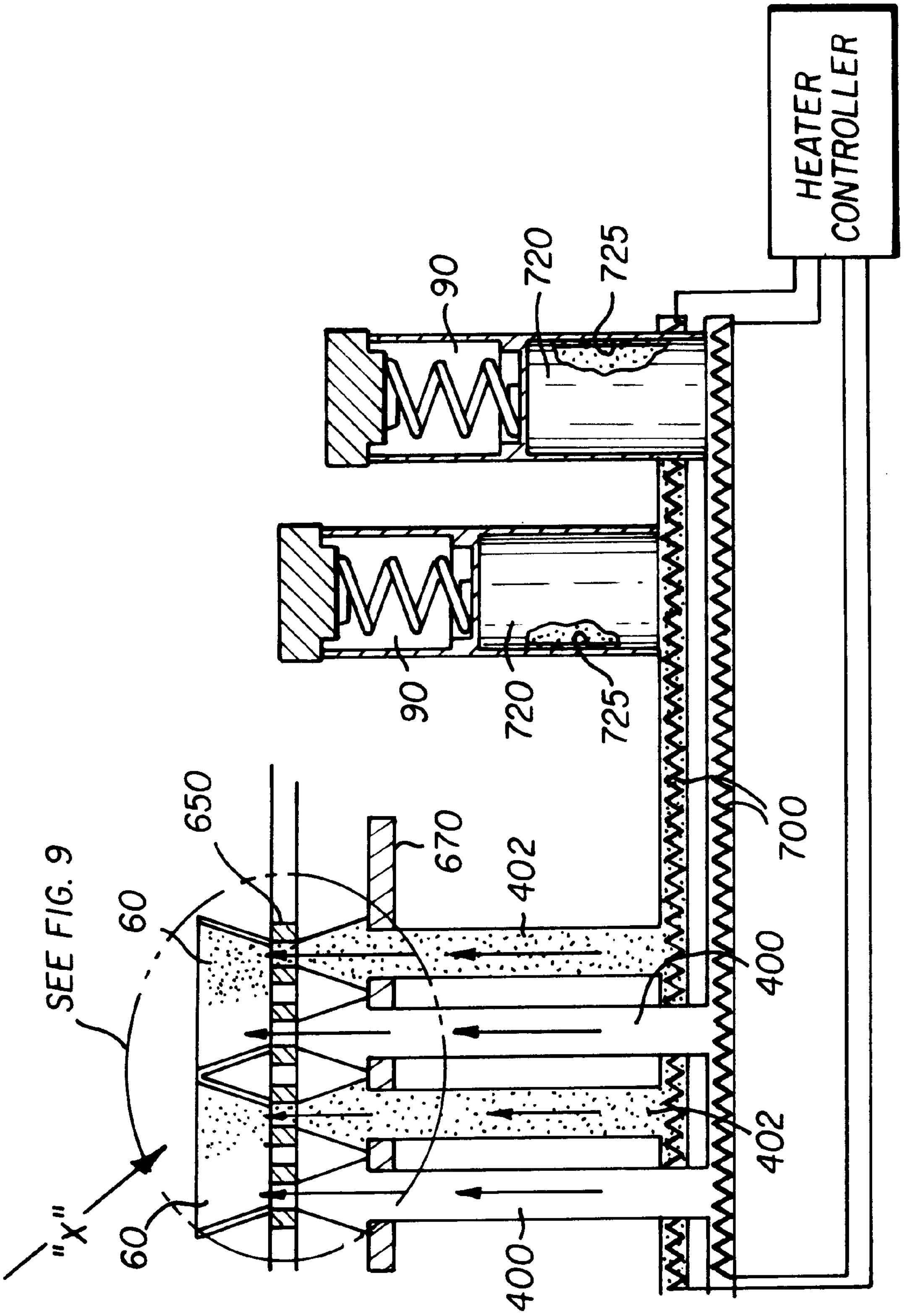
FIG. 8 is a expanded, detailed cross-section view of the microfluidic display apparatus of FIG. 5, showing the first heaters and channels.

A more detailed cross-section view of the plane containing the microchannels in FIG. 6 is shown in FIG. 8. The color ink channels 400 and 402 are laid out in the spatial arrangement that corresponds to those in FIGS. 3 and 6. The solid ink supplies 720 are shown alone, and inserted into their reservoir 725 with a pressurizing spring cap 90 to supply the pressure needed for ink flow. The ink supply lines are shown with resistive heating elements running along the length of the ink supply lines connected to a heater controller so the inks may be maintained in a melted, fluid state. The inks are then conveyed through the color ink channels 400 and 402 by the electrokinetic pump which is the area between the electrodes 650 and 670 to the ink display chambers 60 which are view along the general direction "x".

Figure 9:
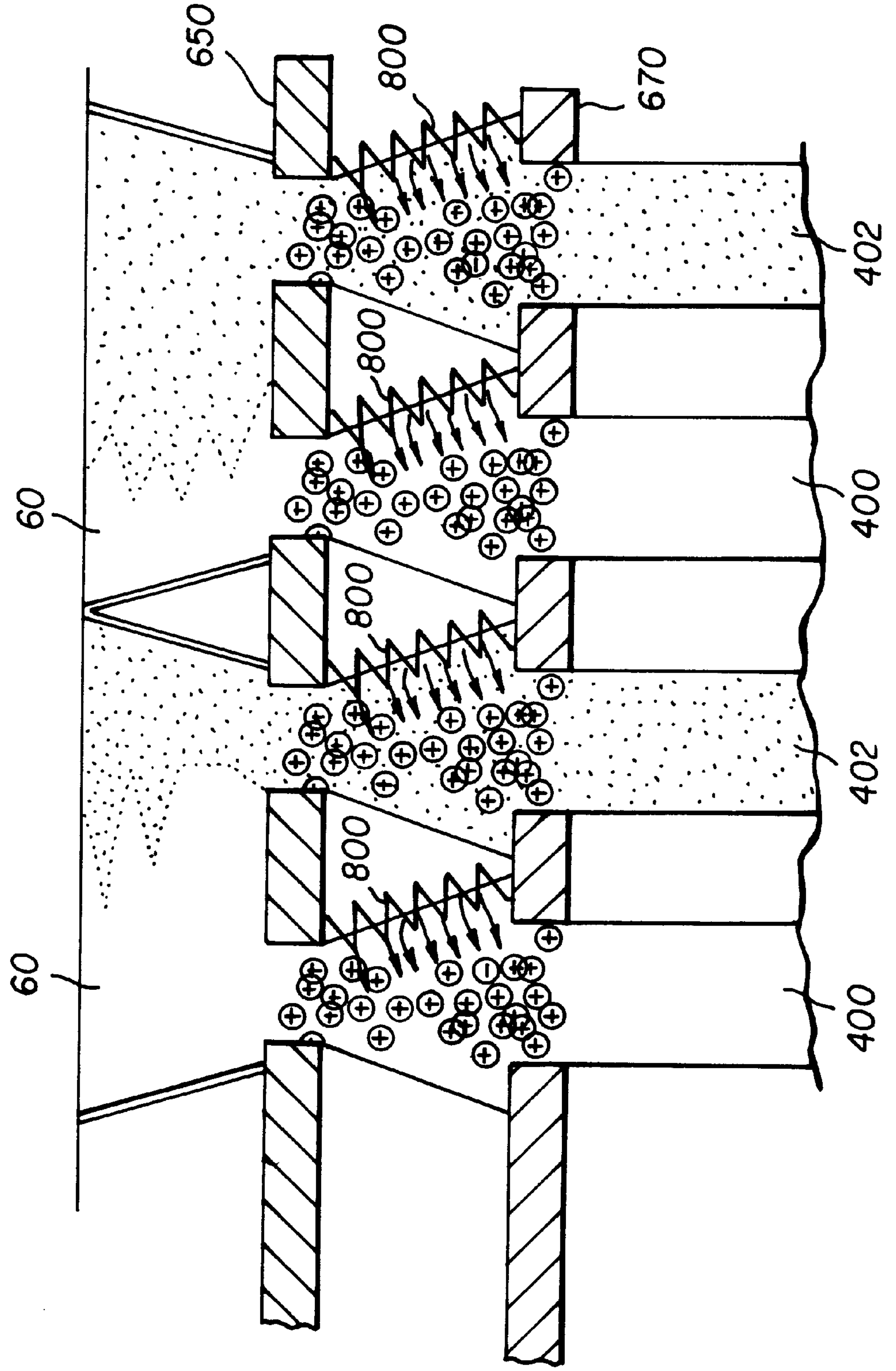
FIG. 9 is a detailed view of the display chambers and showing the second disposed adjacent to the display chambers.

An enlarged view of the circled area of FIG. 8 is shown in FIG. 9, which shows the electrokinetic pumps and the ink display chambers 60 in detail. Also shown are the resistance heating elements 800 connecting the electrodes 650 and 670. The electrodes 650 and 670 have a dual purpose in this embodiment of the invention. They supply the voltage which moves the ions, shown as circled +signs, of the ink from electrode 670 to electrode 650, thus producing the pumping action of the ink fluid. They also supply heat when needed to melt the ink in the ink display chambers 60.

The typical display operation in the present invention involves the following steps. First the display receives a digital image file which is provided by electronic signals in which the color code values are characterized by bit depths of an essentially continuous tone image, for example, 8 bits per color per pixel. The color code values at each pixel define the lightness, hue and color saturation of the pixel. Details of computing ink volumes and the pump parameters are disclosed in the above referenced, commonly assigned U.S. patent applications. When a display is desired the computer 110 activates the first heater elements 700 each disposed in a separate one of the microchannels which heats and melts the ink fluid. The melted ink flows as a result of the capillary action. The computer 110 then applies a electric potential bias between the conducting circuits 500 and 550. The electrokinetic pumps then deliver the correct amount of melted colored ink in accordance with the input digital image file code value to the ink display chambers 60 from corresponding microchannels 300–306 and through corresponding micronozzles 400–406. The computer 110, of course, computes the correct amount of ink that must be delivered in accordance with the image file code values. After the pumping of the inks is completed in a duration computed as described in the above referenced, commonly assigned U.S. patent applications, the first heater elements 700 and the electric potential bias between the row and column electrodes are deactivated; the ink flow between the ink display chambers 60 and the ink micronozzles 600–606 are shut off and the ink solidifies in the display chambers. The mixture of inks, which has the same hue, lightness and color saturation as the corresponding pixel of the original image is held in the display chamber 60 by the high viscosity of the solidified ink. When a new display is desired, a blotter 100 is transported into contact with the ink meniscus of the ink mixing chambers 60. The resistance heating elements 800 are activated by the computer, the inks melt and are then drawn into the blotter 100 by the absorbing force (such as capillary action) of the pores in the receiver. The blotter 100 is then discarded, and the display can be refilled with new ink mixtures to produce the new display.

Reviewing the operation of the display apparatus 9, the computer 110 receives an image file for displaying a plurality of pixels. The apparatus includes a plurality of ink display chambers; ink channels for delivering melted inks to each ink display chamber; and first heater elements for melting solid ink which is to be delivered through the ink channels to the display chambers 60. The display apparatus 9 further includes microfluidic pumps associated with each channel for causing melted ink to be delivered through each channel to the display chambers 60; second heater elements for melting solid ink in the display channels after an image has been displayed; and the computer 110 controls the first heater elements 700 and the microfluidic pumps for causing the first heater elements 700 to melt ink which is caused by the microfluidic pumps to be delivered through the channels to the display chambers 60 where it solidifies to fonn a display of an image and for controlling the second heater elements for melting solid ink in the chambers to discard ink in the display chambers whereby the display apparatus is conditioned to form a new display image.

The invention has been described in detail with particular reference to certain preferred embodiments thereof, but it will be understood that variations and modifications can be effected within the spirit and scope of the invention.

PARTS LIST

| | |
|---|---|
| 8 | display apparatus |
| 9 | microfluidic display apparatus |
| 20 | colorless ink reservoir |
| 30 | cyan ink reservoir |
| 40 | magenta ink reservoir |
| 50 | yellow ink reservoir |
| 60 | ink display chambers |
| 90 | ink pressure controller pressurizing spring cap |
| 92 | heater controller |
| 100 | blotter |
| 110 | computer |
| 200 | cyan ink display chamber |
| 202 | magenta ink display chamber |
| 204 | yellow ink display chamber |
| 206 | colorless ink display chamber |
| 300 | cyan ink supply |
| 302 | magenta ink supply |
| 304 | yellow ink supply |
| 306 | colorless ink supply |
| 400 | cyan ink microchannel |
| 402 | magenta ink microchannel |
| 404 | yellow ink microchannel |
| 406 | colorless ink microchannel |
| 500 | conducting circuit |
| 550 | conducting circuit |
| 600 | cyan ink micronozzle |
| 602 | magenta ink micronozzle |
| 604 | yellow ink micronozzle |
| 606 | colorless ink micronozzle |
| 650 | column electrodes |
| 670 | row electrodes |
| 690 | pinch electrodes |
| 700 | first heating elements |
| 720 | solid ink supplies |
| 725 | solid ink reservoir |
| 800 | resistance heating elements |

What is claimed is:

1. A display apparatus responsive to an image file for displaying a plurality of pixels, comprising:

a) a plurality of ink display chambers;

b) ink channels for delivering melted inks to each ink display chamber;

c) first heater elements for melting a solid ink which is to be delivered through the ink channels to the display chambers which solidifies to form the display;

d) second heater elements for melting solid ink in the ink display chambers after an image has been displayed; and e) means for controlling the first heater elements for causing the solid ink melted by the first heater elements to be delivered to the display chambers where it solidifies to form a display of an image and for controlling the second heater elements for melting the solid ink in the chambers to discard ink in the display chambers whereby the display apparatus is conditioned to form a new display image.

2. A microfluidic display apparatus responsive to an image file for displaying a plurality of pixels, comprising:

a) a plurality of ink display chambers;

b) ink channels for delivering melted inks to each ink display chamber;

c) first heater elements for a melting solid ink which is to be delivered through the ink channels to the display chambers which solidifies to form the display;

d) microfluidic pumps associated with each channel for causing the melted ink to be delivered through each channel to the display chambers;

e) second heater elements for melting the solid ink in the ink display chambers after an image has been displayed; and f) means for controlling the first heater elements and the microfluidic pumps for causing the first heater elements to melt the ink which is caused by the microfluidic pumps to be delivered through the channels to the display chambers where it solidifies to form a display of an image and for controlling the second heater elements for melting the solid ink in the chambers to discard ink in the display chambers whereby the display apparatus is conditioned to form a new display image.

3. The apparatus of claim 2 wherein each of the first heater elements is disposed in each ink channel and the apparatus further includes solid ink supplies for causing solid inks to be disposed in positions where they can be heated by the first heater elements.

4. The apparatus of claim 3 further including means for urging the solid inks to have their end portions to be disposed in the heating positions.

5. The apparatus of claim 2 wherein the second heater elements are each disposed adjacent a different display chamber.

* * * * *